Feb. 9, 1954   J. M. LAWSON   2,668,614
ADJUSTING MECHANISM FOR FEED DOGS ON CONVEYERS
Filed March 30, 1950
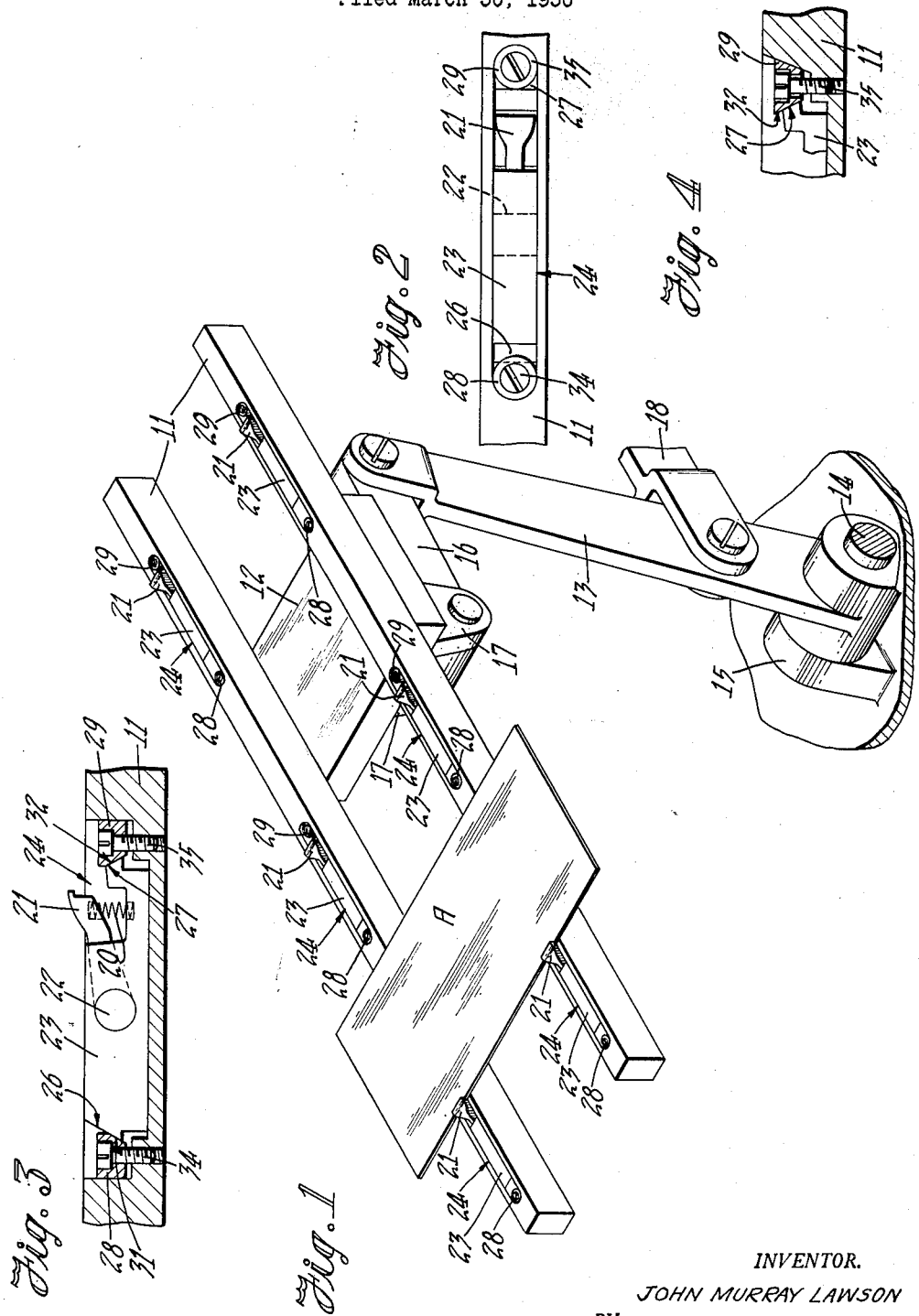
INVENTOR.
JOHN MURRAY LAWSON
BY Charles H. Erne
Ivan D. Thornburgh
ATTORNEYS Patented Feb. 9, 1954

2,668,614

UNITED STATES PATENT OFFICE 2,668,614

ADJUSTING MECHANISM FOR FEED DOGS ON CONVEYERS

John Murray Lawson, Simcoe, Ontario, Canada, assignor to American Can Company, New York, N. Y., a corporation of New Jersey Application March 30, 1950, Serial No. 152,891

5 Claims. (Cl. 198—221)

The present invention relates to machines for feeding articles such as flat blanks, sheets and the like by co-operating conveyors having feed dogs and has particular reference to devices for aligning the feed dogs for proper co-ordination and compensation for wear.

An object of the invention is the provision in a machine having co-operating conveyors fitted with feed dogs for feeding articles, of devices wherein the feed dogs may be readily shifted, individually or as a group, relative to the conveyors for co-ordinating the dogs for co-operative action against an article being fed, and for compensating for uneven wear of the feeding faces of the dogs.

Another object is the provision of such devices wherein the feed dogs of conveyors arranged in parallel relation may be readily shifted into transverse alignment for engaging behind and advancing an article in a predetermined relation to the conveyors.

Another object is the provision of such devices wherein the novel feature includes simple wedge or clamping blocks which are readily adjustable by use of a simple tool to precisely locate a feed dog relative to its conveyor or relative to another co-operating feed dog for co-ordinate feeding action against an article to be fed.

Numerous other objects and advantages of the invention will be apparent as it is better understood from the following description, which, taken in connection with the accompanying drawings, discloses a preferred embodiment thereof.

Referring to the drawings:

Figure 1 is a perspective view of principal parts of a conveyor mechanism embodying the instant invention, with parts broken away;

Fig. 2 is an enlarged fragmental top plan view of a portion of the conveyor showing one of the feed dogs used in the conveyor;

Fig. 3 is a sectional view of the fragmental portion of the conveyor shown in Fig. 2, and Fig. 4 is a fragmentary sectional view similar to Fig. 3 and showing a modified form of the invention.

As a preferred or exemplary embodiment of the instant invention the drawings illustrate principal parts of a double stroke bar feeding mechanism for advancing flat can body blanks A into a machine for making sheet metal can bodies such as the machine disclosed in United States Patent 1,770,041, issued July 8, 1930, to J. F. Peters on Roll Bodymaker.

The feeding mechanism of such a machine comprises a pair of spaced and parallel stroke or feed bars or movable conveyor members 11 which slide in suitable guideways carried in the machine as shown in the Peters patent. These bars are tied together by a tie plate 12 for reciprocation in unison. Reciprocation of the feed bars preferably is effected by a lever 13 disposed in a substantially upright position.

The lower end of the lever 13 is mounted on a pivot pin 14 carried in a pair of spaced bearing lugs 15 which project up from a stationary part of the machine which may be the main frame or an auxiliary part thereof. The upper end of the lever 13 is connected by a link 16 to a pair of lugs 17 which depend from the tie plate 12. Intermediate its ends, the lever 13 is connected by a link 18 to any suitable source of reciprocating motion, such as the eccentric disclosed in the Peters patent. Through this mechanism the feed bars 11 are reciprocated through a forward or feeding stroke and thence through a return stroke, to advance the body blanks A into the machine.

Advancement of the blanks A is effected by spring actuated depressible feed dogs 21 which are carried on pivot members 22 mounted in housings or blocks 23 disposed in recesses 24 formed in the feed bars 11. The housings rest on the bars at the bottoms of the recesses and constitute independently movable mountings for the respective feed dogs 21. The tops of the housings 23 preferably are flush with the tops of the feed bars 11 while the feed dogs 21 extend above the bars and engage behind the blanks A to advance them along a desired path of travel during reciprocation of the bars. Conventional springs 20 located between the feed dogs 21 and the housings 23 hold the dogs in raised or feeding position and permit the usual depression of the dogs as they move back under the advanced blanks during a return stroke of the bars.

The housings 23 are adjustably held in the recesses 24 of the feed bars 11 for alignment of the feed dogs 21 with each other, longitudinally of the stroke bars, for proper co-ordination of the dogs. For this purpose the ends of each of the housings 23 are formed with oppositely disposed tapered or inclined wall sections 26, 27 as best shown in Fig. 3. These tapered wall sections 26, 27 are engaged by clamping or wedge blocks 28, 29 which preferably are cylindrical in shape but which may be rectangular or other shape if desired. Each of the clamping blocks 28, 29 adjacent the tapered wall sections 26, 27 are provided with undercut tapered or inclined clamping faces 31, 32 having a taper substantially corresponding in angularity to the tapered wall sections 26, 27 and which engage against these tapered wall sections 26, 27.

The clamping blocks 28, 29 are located in the ends of the recesses 24 and are held in place by locking screws 34, 35 which extend through the blocks and are threadedly engaged in the stroke bars 11 adjacent the bottoms of the recesses. The ends of the recesses preferably are of the same shape as the shape of the clamping blocks 28, 29 to fully support the blocks opposite their tapered clamping faces 31, 32. However, if desired the blocks may be formed as shown in Fig. 4 in which they are tapered entirely around their peripheries or on two opposing sides and the ends of the recesses may be tapered to provide a seat for the blocks, the openings in the blocks for the screws 34, 35 being considerably larger than the screws to permit lateral shifting of the blocks.

Hence with such a clamping arrangement for holding the housings 23 in place in the feed bars 11, the housings 23 and their feed dogs 21 may be readily shifted longitudinally of the bars by loosening the locking screws at one end of the recesses 24 and tightening the locking screws at the opposite end of the recesses. For example, if it is desired to advance the feed dog 21 shown in Fig. 3, the locking screw 35 is first loosened sufficiently to release the clamping block 29 from the adjacent tapered wall section 27 of the housing 23. The locking screw 34 at the opposite end of the housing is then tightened. The tightening of this screw 34 pulls down on its clamping block 28 and causes the block clamping face 31 to slide along the tapered wall section 26 of the housing and thus pushes the housing and its dog forward toward the right as viewed in Fig. 3. Tightening of the screw 34 continues until the feed dog 21 is advanced the desired distance. After such an adjustment of the dog it is locked in place by retightening the screw 35 at the opposite end of the housing. This clamps the block 29 tight against the tapered wall section 27 of the housing and thus locks the housing in place against displacement. If adjustment of the feed dog is desired in the opposite direction, the reverse of the operations above explained is effected.

Thus any feed dog 21 may be readily adjusted in relation to any other feed dog in a minimum of time with a simple tool. Such an arrangement is especially valuable in aligning co-operating transverse pairs of the feed dogs 21 for squaring them relative to the blanks A to be fed for proper co-ordination of the dogs in properly advancing the blanks, or for compensating for wear of the dog faces. So far as is known such alignment of the feed dogs in the past, because of the fixed nature of the dogs, has been effected only by grinding the faces of the dogs until the desired alignment is obtained. Of course such practice irreparably alters the longitudinal spacings of the dogs while the instant invention permits of maintaining this spacing.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveyor for advancing articles along a path of travel, the combination of a movable conveyor member, a feed dog having an elongated mounting carried on said conveyor member, movable clamping members carried by said conveyor member and engaging against opposite ends of said mounting to hold said feed dog in fixed position on said conveyor member, and spaced screw means on said conveyor member respectively for holding said clamping members in clamping engagement with the opposed ends of said feed dog mounting, the engaged surfaces of said clamping members and said mounting being inclined so that loosening of said screw means at one end of said mounting and tightening the screw means at the other end thereof provides shifting movement of said mounting relative to said conveyor member selectively in opposite directions to adjust said feed dog on and relative to said conveyor member.

2. In a conveyor for advancing articles along a path of travel, the combination of a movable conveyor, a mounting having a feed dog thereon movably carried on said conveyor, separate movable clamping members on said conveyor respectively engaging against opposite ends of said mounting to hold said feed dog in fixed position on said conveyor, the interengaging surfaces of said clamping members and mounting being correspondingly and oppositely inclined at the opposed ends of said mounting, and spaced screw elements having threaded engagement with said conveyor for clamping said members respectively against opposed ends of said mounting, whereby release of one of said screw elements and tightening the other relative to said conveyor obtains longitudinal sliding movement of said feed dog mounting on said conveyor in one direction by virtue of said interengaged inclined surfaces, longitudinal sliding movement of said mounting in the opposite direction on said conveyor being obtained by a corresponding loosening and tightening of said screw elements but in reverse order.

3. In a conveyor for advancing articles along a path of travel, the combination of a movable conveyor member, a mounting having inclined end faces and having a feed dog thereon movably carried on said conveyor member, a pair of wedge shaped blocks respectively engaging against the inclined faces of said mounting for shifting said mounting relative to said conveyor member selectively in opposite directions to adjust said feed dog relative to said member, and a pair of axially movable locking screws having threaded engagement with said conveyor member and respectively engaging said blocks for independently moving said blocks and said mounting relative to said conveyor member, said locking screws after axial movement thereof clamping said blocks against the aforesaid inclined mounting faces to secure the feed dog mounting in adjusted position.

4. In a conveyor for advancing articles along a path of travel, the combination of a movable conveyor element, a feed dog having a mounting therefor carried by said conveyor element, the opposite ends of said mounting having inclined faces, a pair of adjustable wedge shaped clamping blocks carried on said conveyor member and having inclined faces respectively engaging with the inclined faces of said feed dog mounting, and a pair of movable screw members threadedly engaging said conveyor element adjacent opposite ends of said mounting, said screw members respectively extending freely through said clamping blocks for holding the inclined faces thereof in firm clamping engagement with the inclined faces of said feed dog mounting to secure the latter in adjusted position on said conveyor element, turning and axial movement of one of said screw members relative to said conveyor element moving its associated clamping block face against and relative to said inclined face on the adjacent end of said mounting for shifting the mounting relative to said conveyor element to adjust and secure said feed dog in fixed relation thereto.

5. In a conveyor for advancing articles along a path of travel, the combination of a movable conveyor member having a walled recess therein, a depressible feed dog having a mounting therefor movably disposed in said recess, the opposite ends of said mounting having inclined faces thereon, a pair of wedge shaped clamping blocks movably disposed within and adjacent opposite ends of said recess in spaced relation to the inner wall thereof, said clamping blocks having inclined faces respectively engaging the tapered faces of said mounting for locking the mounting in said recess, and a locking screw threadedly engaging said conveyor member and extending through a clamping block, axial movement of said screw as a result of turning thereof moving said clamping block inwardly of said recess while moving the inclined block face along and relative to the adjacent inclined face of said mounting, thereby shifting the mounting relative to said conveyor member to adjust the fixed position of said feed dog thereon.

JOHN MURRAY LAWSON.

References Cited in the file of this patent

UNITED STATES PATENTS

| Number | Name | Date |
|---|---|---|
| 802,394 | Hill | Oct. 24, 1905 |
| 1,578,330 | Lipton et al. | Mar. 30, 1926 |
| 1,770,041 | Peters | July 8, 1930 |
| 2,011,839 | Anderson | Aug. 20, 1935 |
| 2,039,699 | Biazzi | May 5, 1936 |
| 2,200,409 | Backhouse | May 14, 1940 |
| 2,568,905 | Wiehsner | Sept. 25, 1951 |